United States Patent
Moriya et al.

(10) Patent No.: US 6,735,263 B1
(45) Date of Patent: May 11, 2004

(54) DIGITAL COHERENT ENVELOPE DEMODULATION OF FDMA SIGNALS

(75) Inventors: Netzer Moriya, Ramat Hasharon (IL); Moti Itzkovitch, Petach Tikva (IL); Yehuda Albeck, Maale Adumin (IL)

(73) Assignee: Netmor Ltd., Ramat Hasharon (IL)

( * ) Notice: Subject to any disclaimer, the term of this patent is extended or adjusted under 35 U.S.C. 154(b) by 0 days.

(21) Appl. No.: 09/575,517

(22) Filed: May 22, 2000

(30) Foreign Application Priority Data

Sep. 30, 1999 (IL) .................................. 132161

(51) Int. Cl.$^7$ ............................. H04L 27/14; H03D 3/24
(52) U.S. Cl. ......................................... 375/326; 375/376
(58) Field of Search ................................... 375/326, 316, 375/260, 376; 370/208, 344, 319; 329/306, 307

(56) References Cited

U.S. PATENT DOCUMENTS

| | | | | |
|---|---|---|---|---|
| 3,810,019 A | * | 5/1974 | Miller | 375/260 |
| 4,068,210 A | | 1/1978 | Corkhill | 340/17 |
| 4,285,044 A | | 8/1981 | Thomas et al. | 364/721 |
| 4,314,251 A | | 2/1982 | Raab | 343/112 |
| 4,742,356 A | | 5/1988 | Kuipers | 342/448 |
| 4,761,751 A | | 8/1988 | Canniff | 364/721 |
| 4,782,532 A | | 11/1988 | Ecklund | 381/15 |
| 4,849,692 A | | 7/1989 | Blood | 324/208 |
| 4,872,207 A | | 10/1989 | Ecklund | 455/255 |
| 4,888,719 A | | 12/1989 | Yassa | 364/721 |
| 4,905,177 A | | 2/1990 | Weaver, Jr. et al. | 364/721 |
| 5,113,361 A | | 5/1992 | Damerow et al. | 364/721 |
| 5,631,586 A | | 5/1997 | Sogo | 327/106 |
| 5,646,525 A | | 7/1997 | Gilboa | 324/207.17 |
| 6,522,637 B1 | * | 2/2003 | Mimura et al. | 370/319 |

OTHER PUBLICATIONS

Jacob Klapper and John T. Frankle, "Phase–Locked and Frequency–Feedback Systems", Academic Press, New York, 1972; Ch. 8.

"Performance Analysis of Digital Tanlock Loop", Jae Chon Lee and Chong Kwan Un, IEEE Trans. Comm. 30:2398–2411.

"Noise Analysis of a Digital Tanlock Loop", Carlos A. Pomalaza–Raez, IEEE Trans. AES 24: 713–718.

* cited by examiner

*Primary Examiner*—Tesfaldet Bocure
(74) *Attorney, Agent, or Firm*—Fitch, Even, Tabin & Flannery

(57) ABSTRACT

A method for coherent detection and demodulation of a FDMA signal, that is a superposition of amplitude modulated carriers, is provided. An array of special digital phase-locked loops (PLLs) is implemented in a digital signal processor (DSP) for processing the received signal after it is digitized, and for extracting the envelopes corresponding to each carrier. Each PLL is deliberately made to slowly respond to error signals in order to allow the loop to preserve its phase while the amplitude value of the envelope flips sign. A down-decimation technique is employed in order to reduce the computational load. This is achieved by applying a finite impulse-response filter (FIR) only once per each frame, thereby only a single multiplication of the frame by the vector of filter's taps is employed. A digital generation of sine and cosine sampled waveforms is employed inside a PLL by using a real-time solution of a difference equation. Implementation of the sine and cosine generation inside a PLL provides an automatic control of the sine and cosine phase.

20 Claims, 6 Drawing Sheets

DIGITAL COHERENT ENVELOPE DEMODULATION OF FDMA SIGNALS

FIELD OF THE INVENTION

The present invention relates to coherent detection and amplitude demodulation of frequency division multiple access (FDMA) electromagnetic signals. More specifically, it relates to the field of coherent detection of suppressed amplitude modulated carriers, particularly for determining position and orientation of a moving object.

BACKGROUND OF THE INVENTION

The concept of transmitting and receiving electromagnetic signals for determining position and orientation of a moving object is known in the prior art (see, for example, U.S. Pat. No. 4,314,251, U.S. Pat. No. 4,742,356, U.S. Pat. No. 4,849,692, U.S. Pat. No. 5,646,525 and the references thereof). The systems based on this concept, typically, include a plurality of transmitters generating electromagnetic fields and a magnetometer that may be any transducer, or plurality of transducers. Each of these transducers is capable of producing an output that is an analog electric signal proportional to superposition of the received electromagnetic fields. For instance, the magnetometer may receive multiplicity of signals simultaneously using frequency division multiple access (FDMA). The foregoing prior art describes various techniques, wherein the output of the detector can be converted into the moving object position and orientation relative to a reference coordinate frame associated with a source having a plurality of the transmitters.

For example FIG. 1a illustrates a practical situation in which two electromagnetic field transmitters A and B, representing any number of transmitters, generate oscillating electromagnetic fields, which are received by a magnetometer C. Each of these electromagnetic waves may be distinguished by its unique oscillating frequency. The strength of each individual field, characterized by its amplitude, is a function of coordinates, which are determined by the reference coordinate frame. The strength of the signal produced by the magnetometer depends not only on its position but also on the angle between the magnetic field and the surface of the magnetometer. The transmitted electromagnetic fields, transmitted at high frequencies, serve as carriers whose amplitude is modulated by the motion. As the magnetometer C varies its location and orientation by changing its coordinates and angles in the space over time, the amplitude of the output electric signal produced by the magnetometer also changes, thus creating a time-dependant waveform. This waveform is a superposition of all carriers, each modulated according to the location and orientation of the magnetometer. Hence, the individual waveform for each carrier is thereby determines an envelope that is a function of the magnetometer location and orientation in time. A total analog electric signal produced by the magnetometer (referred to hereinafter as a received message) is proportional to the strength of the entire electromagnetic field whose value is proportional to the superposition of the field strength of individual modulated carriers of the all transmitters.

FIG. 1b illustrates the modulation of the carriers originated from transmitters A and B each by its own envelope. FIG. 1c depicts the analog electric signal V produced by the magnetometer over time in a multi-transmitter environment of transmitters A and B. In general, the received message is proportional to a superposition of the amplitude-modulated carriers of the all transmitters within reception limit. It is relevant to note that the received message also may include some noise (not shown).

Accordingly, since the envelope modulating the carrier is a function of the magnetometer location and orientation, then demodulation of the received message for the purpose of estimation of the individual envelop corresponding to each individual carrier is a very important task.

Commonly, a digitally implemented phased-locked loop (PLL), in a digital signal processor (DSP), is assigned to the task of demodulating the received message. PLL in general, is fairly known in the prior art (see, for example, Jacob Klapper and John T. Frankle, Phase-Locked and Frequency Feedback Systems, Academic Press, New York, 1972; Ch. 8), however these techniques were employed usually for carrier recovery rather than for processing the received message and envelope demodulation.

There is, accordingly, a need in the art to provide a method and a system for envelope extraction based on the PLL technique. The quality of the envelope estimate depends on the ability to overcome all sources of inaccuracies such as coupling between the individual carriers and harmonic distortions while preserving a spectral bandwidth covering the spectrum of the modulating signal. In addition, the demodulation process should be performed in real time and introduce only a short processing delay. This is relatively complicated computation task, which adversely effects the DSP performance and may interfere with real-time requirements. An application of the PLL technique in DSP may allow coping with these problems.

One has to bear in mind that the modulating signal may take either positive or negative value. Thus recovering the sign of the envelope is essential for unambiguous tracking. A specific design of PLL, namely tanlock may be used when the sign of the envelope is of importance as in the case for magnetic trackers. While implementation of tanlock design in PLL technique is known in the prior art (see, for example, "Performance Analysis of Digital Tanlock Loop", Jae Cohn Lee and Chong Kwan Un, IEEE Trans. Comm. 30:2398–2411; "Noise Analysis of a Digital Tanlock Loop", Carlos A. Pomalza-Raez, IEEE Trans. AES 24:713–718; U.S. Pat. No. 4,068,210, U.S. Pat. No. 4,782,532, U.S. Pat. No. 4,872,207), it was not applied therein for envelope extraction.

Moreover, an ordinary PLL, including tanlock-type PLL, are both designed to respond as quickly as the signal-to-noise ratio permits. However, this is a drawback in the problem where a signed enveloped is needed. Rather, a slow response is desired such that the phase of the voltage-controlled oscillator (VCO) of a phase locked loop would preserve its phase when the sign of the envelope flips.

It should be noted that during the process of envelope extraction, it is necessary to synthesize sine and cosine trigonometric functions. One common approach for the synthesis of the trigonometric functions is to build a lookup table. This method can be further enhanced by interpolation between table entries (see, for example, U.S. Pat. No. 4,905,177). Alternatively, sine and cosine waveforms can be synthesized using a real-time solution of a difference equation (see, for example, U.S. Pat. No. 4,888,719). Several enhancements to these methods were disclosed (see, for example, U.S. Pat. No. 5,113,361, U.S. Pat. No. 4,761,751, U.S. Pat. No. 5,631,586). Despite the apparent superiority of the difference equation method, due to the finite precision of the computer, implementation of difference equation solution in DSP may produce an accumulating error. The error may lead to both phase and amplitude drift (see, for example, U.S. Pat. No. 4,285,044) affecting the accuracy of the envelope calculation, and thus a control mechanism is required.

There is, accordingly, a need in the art to provide an improved method and system for coherent detection, and demodulation of a FDMA signal comprising a superposition of different carrier amplitude modulated signals. The improved method and system utilize a phase locked loop technique for the envelope extraction and might cope with the drawbacks of the hitherto known usage of the PLL technique. There is a further need in the art to provide a novel technique for generation of the sine and cosine trigonometric functions within a PLL.

SUMMARY OF THE INVENTION

According to the invention, a magnetometer in a multi-transmitter environment receives a signal originated from several transmitters and produces an s analog electric signal, which is the received message, that is proportional to superposition of amplitude-modulated carriers of the all transmitters. Further, this analog electric signal is digitized and all signal processing is performed digitally.

In accordance with a preferred embodiment of the invention, an array of special digital phase-locked loops (PLLs) is implemented in a DSP for processing the received message after it is digitized and extracting the envelopes corresponding to each carrier. Each loop is tuned and locked on a single carrier. Thus, each member of the loop-array produces an estimate of the envelope of a single carrier.

In accordance with the invention, the PLL is implemented in a DSP and used for coherent envelope extraction is deliberately made to slowly respond to error signals. This mechanism allows the loop to preserve its phase while the amplitude value of the envelope flips sign.

In accordance with another aspect of the invention, a down-decimation technique is employed in order to reduce the computational load. This is achieved by applying a finite impulse-response filter (FIR) only once per each frame, thereby only a single multiplication of the frame by the vector of filter's taps is employed.

In accordance with yet another aspect of the invention, a digital generation of sine and cosine sampled waveforms is employed inside a PLL by using a real-time solution of a difference equation. Implementation of the sine and cosine generation inside a PLL provides an automatic control of the sine and cosine phase.

In accordance with a broad aspect of the invention there is provided a method for coherent detection and demodulation of a FDMA signal being a superposition of amplitude modulated carriers, the method comprising the steps of:
(i) receiving said FDMA signal by a system for detection and demodulation of the signal; and
(ii) processing the signal by using a PLL technique and extracting an envelope of at least one carrier.

In accordance with another broad aspect of the invention there is provided a system for coherent detection and demodulation of a FDMA signal being a superposition of amplitude modulated carriers of said transmitters, the system comprising a digital coherent detector for receiving said FDMA signal, processing the signal and extracting a signed envelope of at least one amplitude modulated carrier, the detector comprising:
(i) a transducer for transforming said FDMA signal into analog electric signal,
(ii) a front-end electronics for receiving said analog electric signal and providing pre-amplification and pre-filtering of the input signal,
(iii) an analog to digital converter (ADC) for translating the electric signal coming after said front-end electronics into digitized signal data sampled at fixed ADC sampling intervals, and
(iv) a digital signal processor (DSP) for processing the digitized signal data and providing a real-time estimate of the signed envelope of at least one amplitude modulated carrier, the detector synchronized by a synchronization signal delivering initial phase information to the DSP for estimation of the envelope sign.

BRIEF DESCRIPTION OF THE DRAWINGS

The presented invention will be more fully understood hereinafter from the following detailed description of preferred embodiments when taken in conjunction with the following drawings, in which:

FIG. 1b illustrates the modulation of the carriers originated from transmitters A and B in the tracking system of FIG. 1a.

DETAILED DESCRIPTION OF A PREFERRED EMBODIMENT

Figure 2:
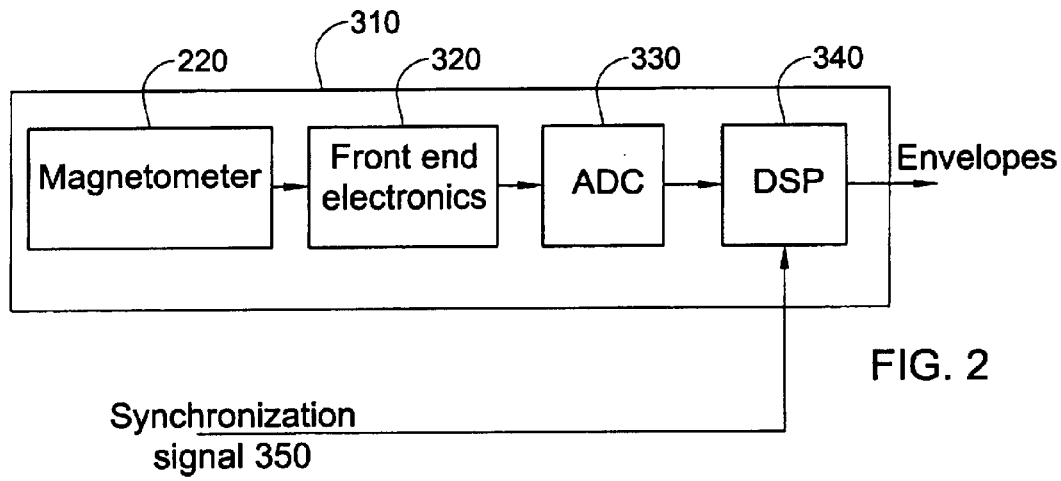
FIG. 2 is a simplified block diagram of a preferred embodiment of a system for coherent detection and demodulation of an FDMA signal according to the present invention.

Attention is first directed to FIG. 2 showing a simplified block diagram of a system for coherent detection and demodulation of a FDMA signal according to a preferred embodiment of the present invention. The system includes a digital coherent envelope detector 310 that is synchronized by a synchronization signal 350. The detector 310 includes a magnetometer 220, a front-end electronics 320, an analog to digital converter 330 (ADC) and a digital signal processor 340 (DSP). In operation, the magnetometer 220 receives a multi-transmitter signal originated from several transmitters and produces an analog electric signal, which is the received message proportional to a superposition of the amplitude-modulated carriers of all the transmitters. The analog electric signal produced by the magnetometer is fed to the front-end electronics 320 that provides pre-amplification and pre-filtering and feeds the processed signal to the analog to digital converter 330 (ADC). The role of the circuit 320 is known per se to a man of the art and, therefore, is not further expounded upon herein. The ADC 330 converts the so amplified and filtered analog electric signal into digital data (real-time data sampled at fixed ADC sampling intervals), and these data are supplied to the DSP 340 that processes the data and yields the envelopes.

Preferably, an automatic gain control (AGC) unit (not shown) is integrated into the front-end electronics 320. The AGC maintains, as is known per se, the dynamic range of the data large enough to make optimal use of the ADC 330. It further maintains the dynamic range of the data small enough to avoid an overflow of the ADC 330. When an AGC is used, the gain currently in use would preferably also be delivered along with the data to the DSP 340. Thus the digital data sampled by the ADC 330 are delivered to the DSP 340 along with the gain and synchronization data from the synchronization signal 350 that is preferably provided for determination of the sign of each envelope. The outputs of the DSP 340 as specified above are the signed envelopes.

In operation, a plurality of transmitters generates a plurality of low frequency electromagnetic fields distributed, for example, in the frequency window between 5 kHz and 20 kHz. In accordance with the sampling theorem, as prescribed by the Nyquist sampling theorem, proper sampling requires that the samples be taken at a rate higher than twice the highest frequency present in this window. Thus, for the aforementioned frequency window, a sample rate of, e.g., 50 kHz complies with the specified Nyquist sampling theorem. As it should be understood by a man versed in the art, this example is not binding and the electromagnetic fields may be distributed in another frequency window.

Figure 3:
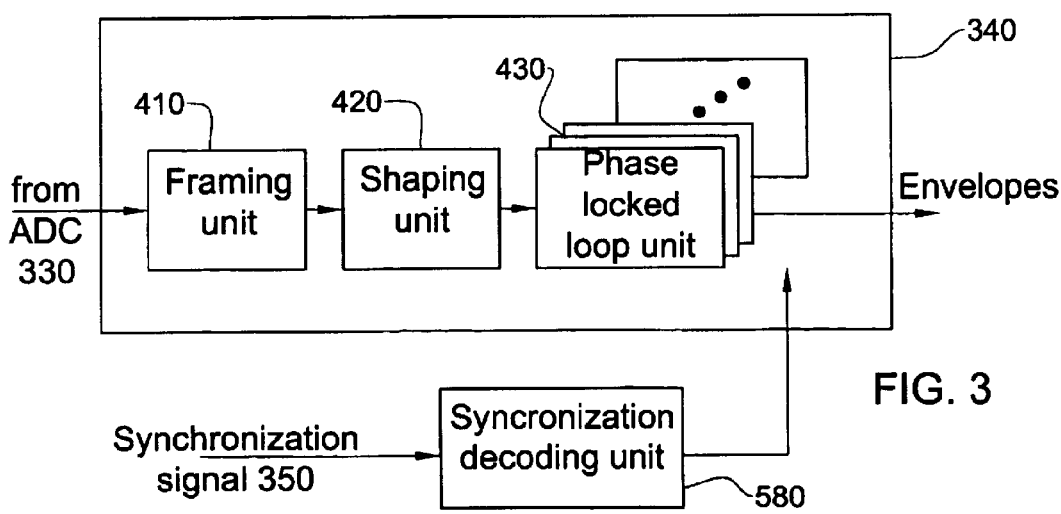
FIG. 3 is a simplified block diagram of a digital signal processor of FIG. 2 illustrating the computational steps performed by the digital signal processor.

FIG. 3 depicts the computational components of the DSP 340. It should be noted that the same reference numerals shown in FIG. 2 are employed as those for denoting the same or similar elements represented in the following drawings. A framing unit 410 receives the sampled digital data from the ADC 330. The role of the framing unit is to collect the data delivered at the ADC sampling intervals and store them in the memory of the DSP. The sampled data are broken up into frames, each containing a predetermined number of samples. Thus for the foregoing example, preferably, a refresh rate of 100 Hz, i.e. a frame of 10 millisecond may be chosen. Such selection of the frame period results in 500 samples per frame. As it should be clear to a versed man, the number of samples within this frame depends on the ADC sampling rate. In turn, in order to avoid aliasing, this sampling rate, as it was mentioned above, must comply with the Nyquist rule. Thus, if the highest carrier's frequency is, e.g., 20 kHz, and the modulation bandwidth is limited to, e.g., 500 Hz, a sampling rate higher than 41 kHz is sufficient.

In order to avoid an ever-increasing calculation delay, it is preferable that the sampling time will exceed the frame processing time. In the latter example, the processing time of each frame should be less than that of sampling time i.e. less than 10 milliseconds. Hence, the framing process is executed in parallel to the next step of computation. In most commercially available digital processors, this goal is readily achieved using e.g. direct memory access (DMA) technology, all as known in the prior art per se.

The data delivered by the ADC 330 and collected by the framing unit 410 is not necessarily ready for processing by the envelope extractor. For example, the ADC may deliver integer data whereas the DSP processes floating-point data. Sometimes, the ADC and the DSP do not share the same word length in terms of number of bits. Thus, a shaping unit 420 may be utilized in order to transform the data delivered by the ADC into a compatible form readable by the DSP.

Figure 1A:
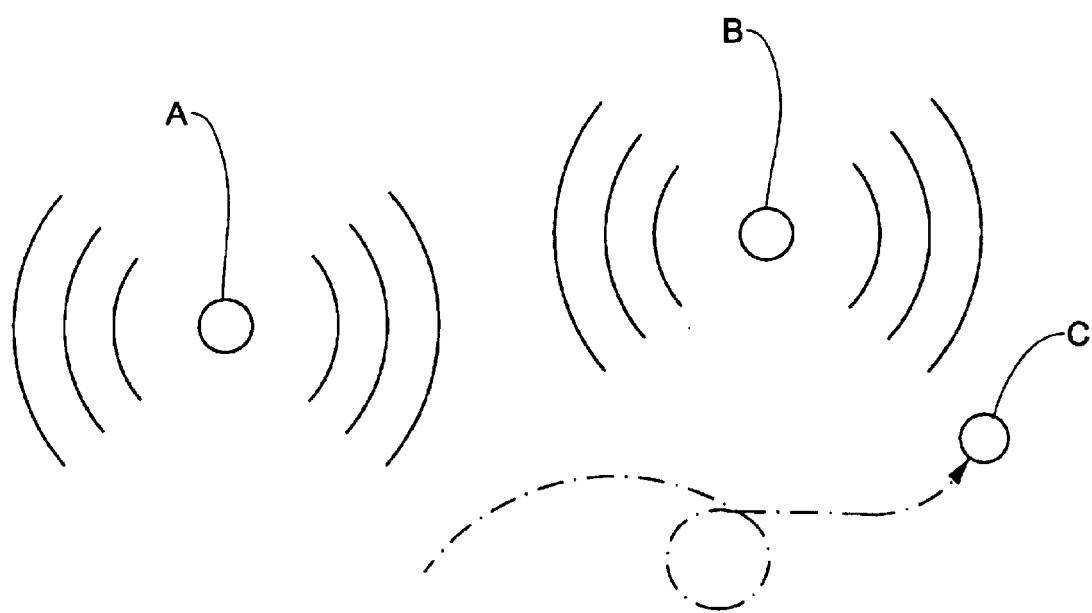
FIG. 1a is a schematic illustration of an application of simplified tracking system that employs the envelope extraction technique of the invention for determining the spatial location and orientation of an object.
Figure 1B:
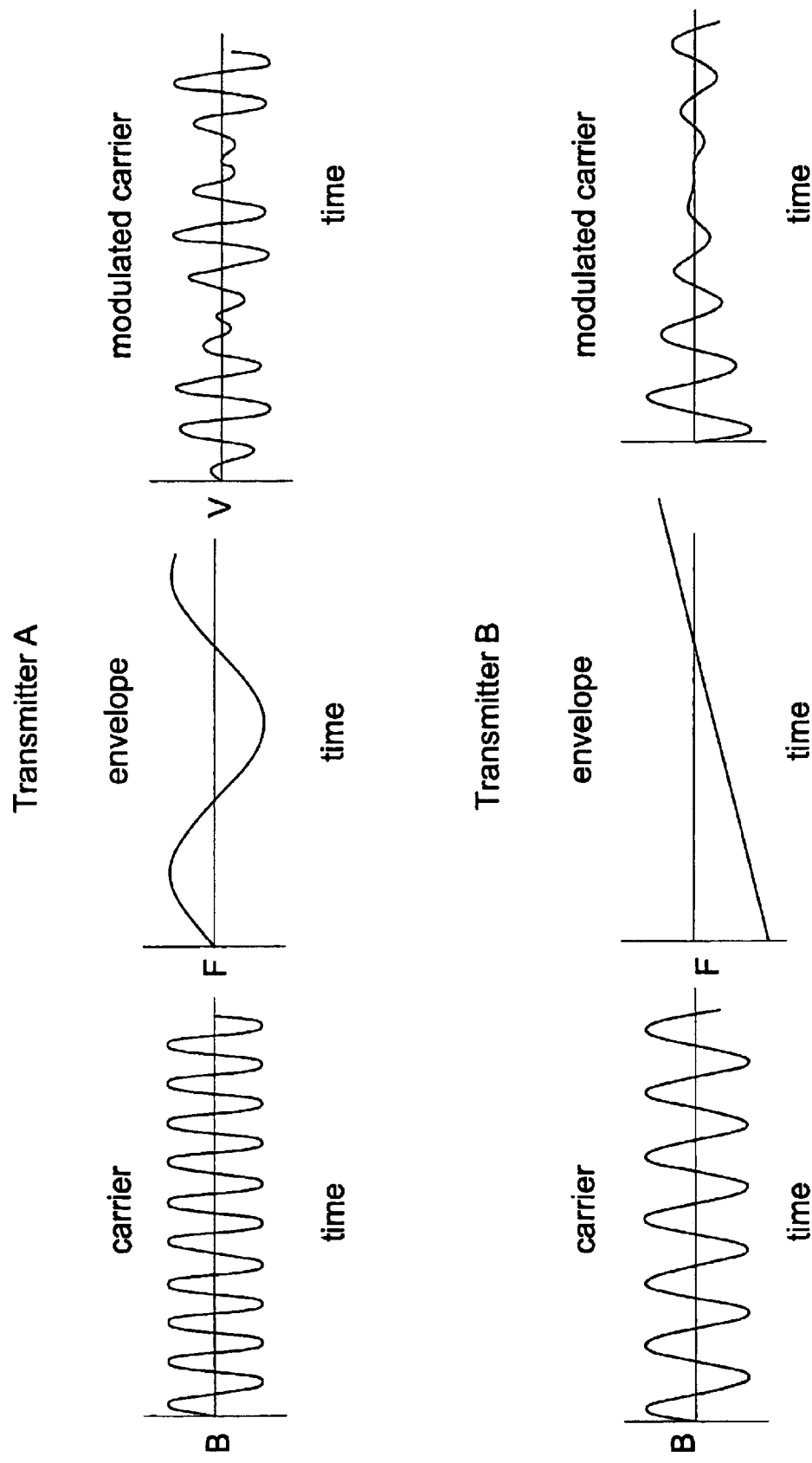
Figure 1C:
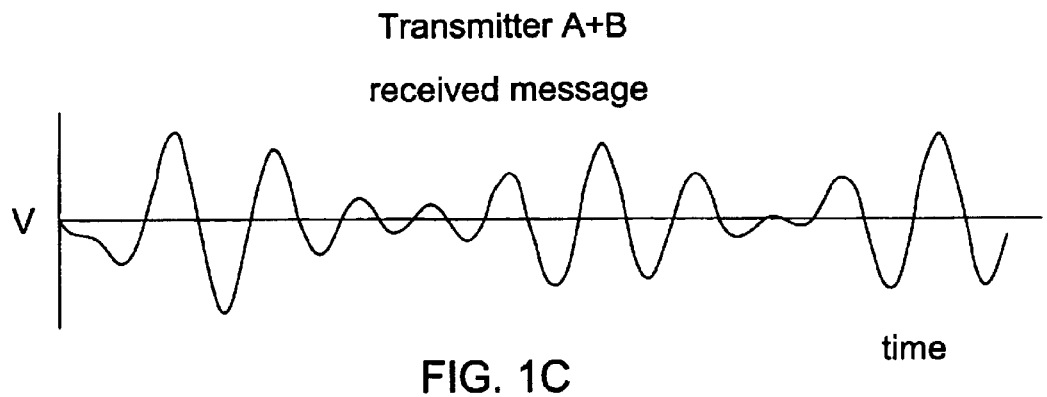
FIG. 1c is an analog electric signal produced by the magnetometer in a multi-transmitter environment of transmitters A and B of FIG. 1.

Each member of the array of phase-locked loop (PLL) units 430 receives ready-to-process frames of data from the shaping unit 420. In a multi-transmitter environment, a single PLL unit would preferably be implemented for each carrier whose envelope is sought. Therefore, each unit in the PLL array 430 is related to a specific transmitter and estimates a single envelope of a single and different carrier. After the processing, each such frame is translated into a set of numerical values, wherein every value from this set corresponds to different envelope. Hence, for the example shown in FIG. 1b these numerical values will correspond to the envelopes of transmitter A and transmitter B, respectively.

Those skilled in the art will readily appreciate that several similar PLL units 430 may be implemented in a single DSP 340 unit. Since the operation of these PLL units is virtually identical, it is sufficient to describe a single PLL. It is implicitly assumed that as many PLL units as necessary are implemented using the same method and each PLL unit operates on the same data frame.

In accordance with the invention, a main purpose of a PLL unit in operation is to down-convert the data provided by shaping unit to the baseband, reject envelops and carriers others than the one of interest, and provide the envelope of a single carrier. From mathematical point of view, a direct order of operation of the PLL unit would be a down-converting the signal to baseband by using multiplication of the data by the sine and cosine waves, and then an extraction of the amplitude by using the FIR filter. However, in accordance with the present invention, the data are multiplied first by the FIR filter and only then are multiplied by the cosine and cosine waves. By doing so, one has to multiply by the FIR filter only once, and thereby saving some computational load.

Figure 4:
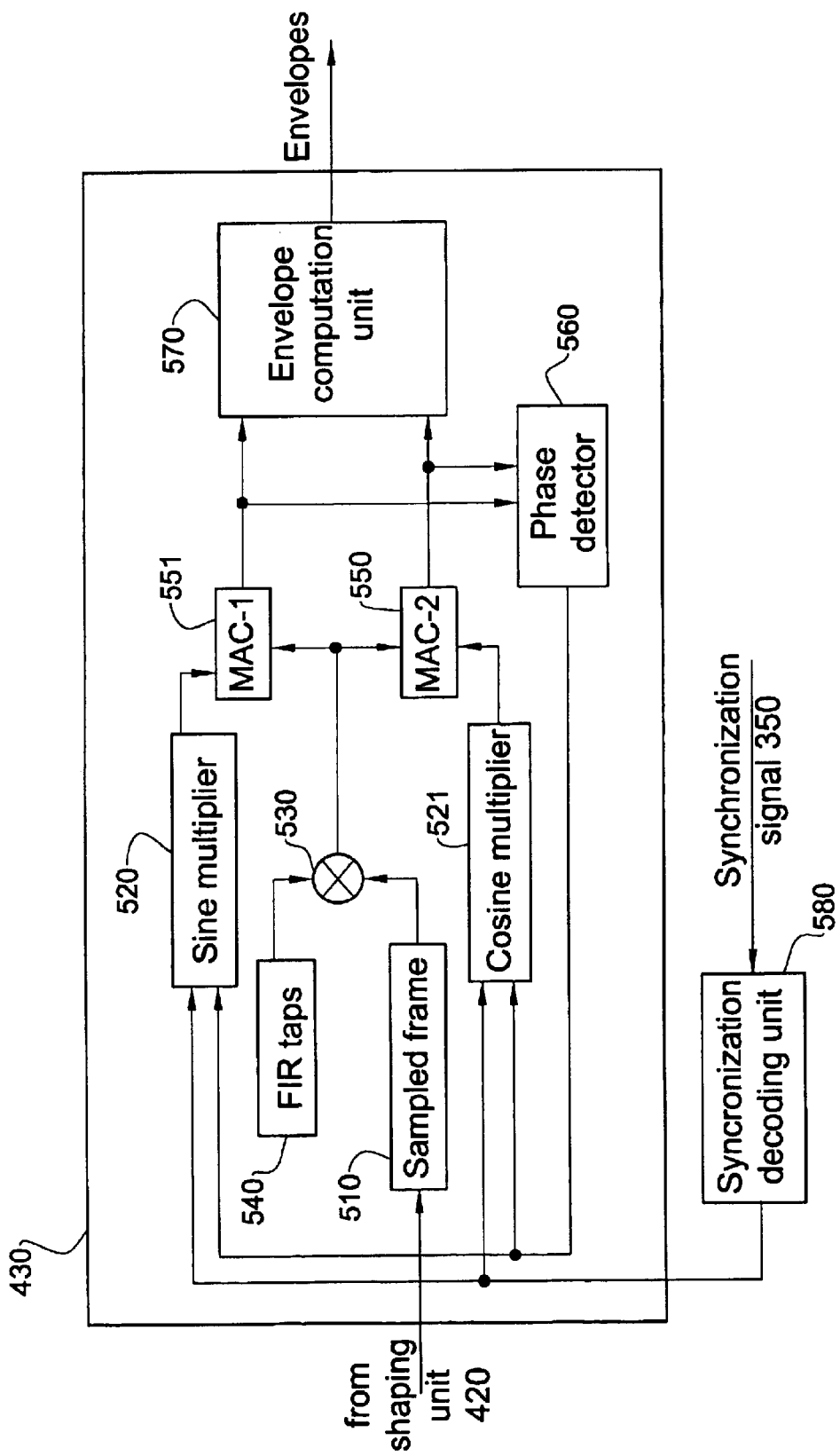
FIG. 4 is a block diagram illustration of operation of a phase locked loop unit of FIG. 3.

FIG. 4 depicts the main component of a single PLL unit 430 of the present invention. By using a multiplier 530, a frame 510 delivered from the shaping unit 420 is multiplied point-by-point by a vector that consists of taps of a low-pass filter 540. These taps are constants, computed off line, and, preferably, stored in the DSP 340 memory. The resulting frame is multiplied point-by-point by a sine-wave multiplier 520 implemented inside the PLL unit, and the results are summed up by a first multiply-and-accumulate unit 551 (MAC-1). Additionally, the output of the multiplier 530 is multiplied point-by-point by a cosine-wave multiplier 521 and a second multiply-and-accumulate unit 550 (MAC-2) sums up the results. The synthesis of the sine-wave multiplier 520 and the cosine-wave multiplier 521 will be described hereinbelow.

The PLL unit hereby disclosed employs a digital, down-decimated, flat pass-band, and sharp cutoff low-pass filter (LPF). Preferably, the low-pass filter 540 is a finite impulse-response filter (FIR) whose cutoff frequency is smaller than the difference between the frequencies of two adjacent carriers. Note that the closer the frequencies of individual carriers to each other, the narrower the filter that must be selected, and, therefore, the more demanding is its implementation.

In addition, preferably, the cutoff frequency of the low-pass filter would be smaller than half the inverse of the interval by which frames are delivered to the PLL. This rate, in turn, must be larger than twice the highest spectral component contained in the envelope. As those skilled in the art will easily appreciate that a violation of the first condition may cause a coupling between different carriers, whereas a violation of the second condition may cause an alias due to under-sampling. Note that the taps of the filter 540 may or may not vary according to the carrier whose envelope is computed.

In addition, it is preferable to implement a LPF that introduces a small and linear phase shift. Those skilled in the art should readily appreciate that a linear phase shift may be readily achieved by employing a finite impulse-response filter (FIR). However, conventional FIR filters that produce sharp cutoff along with flat pass band, generally, consist of a large number of taps. Thus, their usage introduces heavy computational load since the computational load is proportional to the product of the number of taps and the sampling rate.

According to the present invention, in order to reduce the computational load a down-decimation technique is employed. Ordinarily, the multiplication of a frame by the filter would take place for each sampled point, and produce a digital convolution of filter taps with the sampled data. However, in accordance with the invention, each PLL unit 430 only produces a single estimate for each frame thus only a single multiplication of the frame by the vector of the filter's taps is employed. For example, if the carrier frequency is 50 kHz and the multiplication is performed once for 500 sampled points of the frame, then the filter output is down decimated to 100 Hz. One has to bear in mind that usage the down-decimation technique imposes a restriction on the filter's cutoff frequency, which should be smaller than half the down-decimated frequency. Thus for the foregoing example, the cutoff frequency should be smaller than 50 Hz.

In general, this technique may reduce the computational load by two or three orders of magnitude depending on the ratio between the sampling rate and the PLL output rate. One has to bear in mind that this ratio, in turn, depends on the ratio between the frequency of the carrier and the bandwidth of the envelope, which in many cases is very large.

For example, the number of data samples in a frame often may exceed several hundreds. A FIR filter having several hundred taps may be designed in a known per se manner in order to produce very sharp cutoff and narrow pass band. By implementing the filter multiplication only once for each frame instead of a fill convolution, the task may be readily performed.

According to the invention, the outputs of the MAC-2 unit 550 and the MAC-1 unit 551 are fed into an envelope computation unit 570 and a phase detector 560. The phase detector unit 560 produces an error signal that is used for locking the loop. In order to understand the locking process it is relevant to note that the PLL is locked when two conditions are met. First, the frequency of the sine- and cosine-wave multipliers should be equal to the frequency of the carrier, and second, the phase of the sine-wave multiplier should be either equal to the phase of the carrier or 180 degrees off the phase of the carrier. Accordingly, when the filter is locked the phase of the cosine-wave multiplier is orthogonal to the phase of the carrier. Indeed, as it should be clear to those skilled in the art, due to the condition of orthogonality, the scalar product of the output of the multiplier 530 and the cosine-wave would equal zero.

Figure 5:
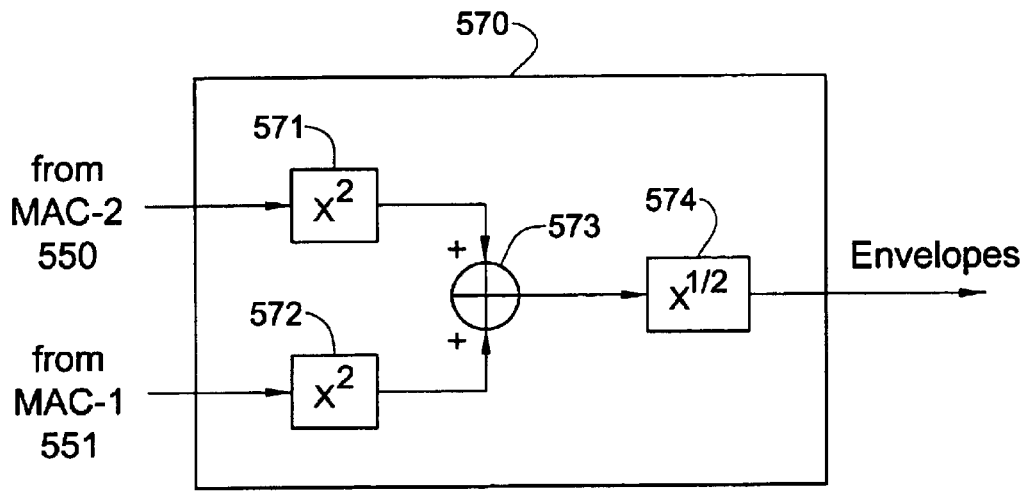
FIG. 5 is a functional block diagram of operation of an envelope computation unit of FIG. 4.

In order to understand the manner of computing the envelope values when the loop is not locked, reference is made to FIG. 5, which illustrates the operation of the envelope computation unit 570. Accordingly, a first squaring operator 571 squares the output of the MAC-2 unit 550 and a second squaring operator 572 squares the output of the MAC-1 unit 551. An adder 573 of the envelope computation unit 570 suns the outputs of the operators 571 and 572 and an operator 574 computes the square root of the summation provided by the adder 573. The output of the operator 574 is the envelope of the carrier of interest. The so computed envelope is assigned the same sign as that of the output of MAC-2 550. When the loop is locked, the output of the MAC-2 550 by itself may also be used as the resultant envelope.

Figure 6:
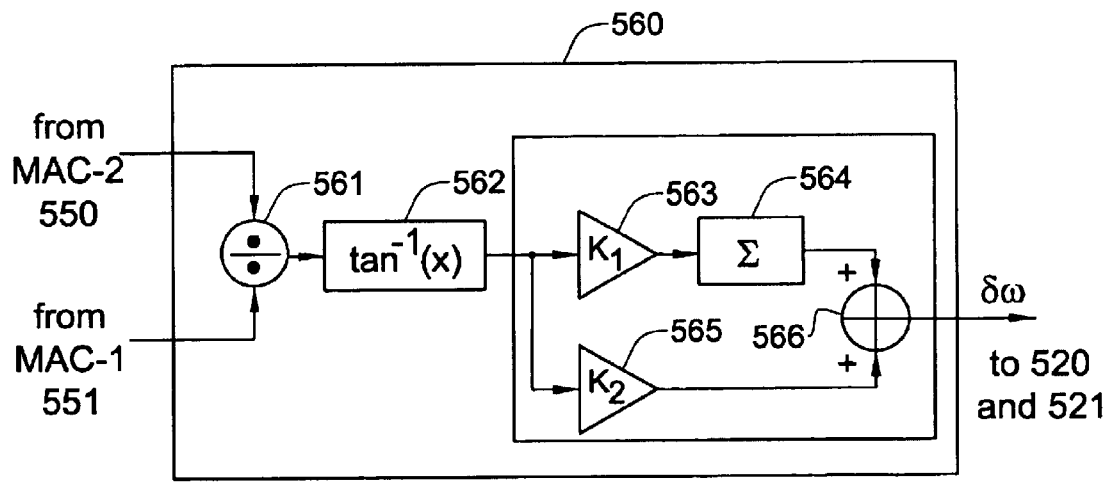
FIG. 6 is a functional block diagram of operation of a phase detector of FIG. 4.

When either the frequency or the phase of the sine-wave multiplier is not equal to that of the carrier, a correction is required. Hence, FIG. 6 depicts the operation of a phase detector 560 that is designed for detecting possible such discrepancies, and producing an error signal δω used for the correction. The error signal δω is calculated consequently frame by frame, and would equal zero if both the frequency and the phase of the carrier match those of the sine-wave multiplier.

Accordingly, information about the discrepancies is, preferably, extracted by comparing the output of the MAC-2 550 to the output of the MAC-1 551. First, a divider 561 divides the output of the MAC-2 550 by the output of the MAC-1 551. Then, a unit 562 computes the inverse tangent of the result of division provided by the divider 561. These last two operations, along with consideration to the sign of the outputs of the MAC-1 and MAC-2, map any possible phase discrepancy into the range between $-\pi$ and $\pi$. However, if the output of the MAC-1 551 equals zero then the division is skipped and the output of unit 562 is assumed the value $\pi/2$.

Further processing within the PD unit 560 provides a loop filter wherein the output of unit 562 is split into two channels. In the first channel the output of the unit 562 is multiplied by a constant $K_1$ by a gain unit 563, and then it is integrated over time by an integrator 564. In the second channel, the output passes through a gain unit 565 where it is multiplied by a constant $K_2$. Further, the outputs of the two channels are summed up by an adder 566 and the result is delivered to the sine-wave multiplier 520 and the cosine wave multiplier 521.

As it should be clear to those skilled in the art, the constants of the loop filter, $K_1$ and $K_2$, control the time constant of the PLL unit 430. In accordance with present invention, the constants $K_1$ and $K_2$ are set to relatively large time constants. This setting preserves the phase of the sine-wave multiplier 520 and the cosine-wave multiplier 521. Only if the filter is not locked for a relatively long time, a significant error signal δω would be created, and phase of the multipliers 520 and 521 affected. Hence, when the envelope flips its sign, the phase would be preserved, and a temporary error signal that may be produced at the frame where the sign-flip actually took place would be ignored. Since the loop is locked to both the carrier and to the inverted carrier, it would not lose its lock due to the sign-flip. However, the sign of the result of the MAC-2 unit 550 would still reflect the sign of the envelope.

Figure 7A:
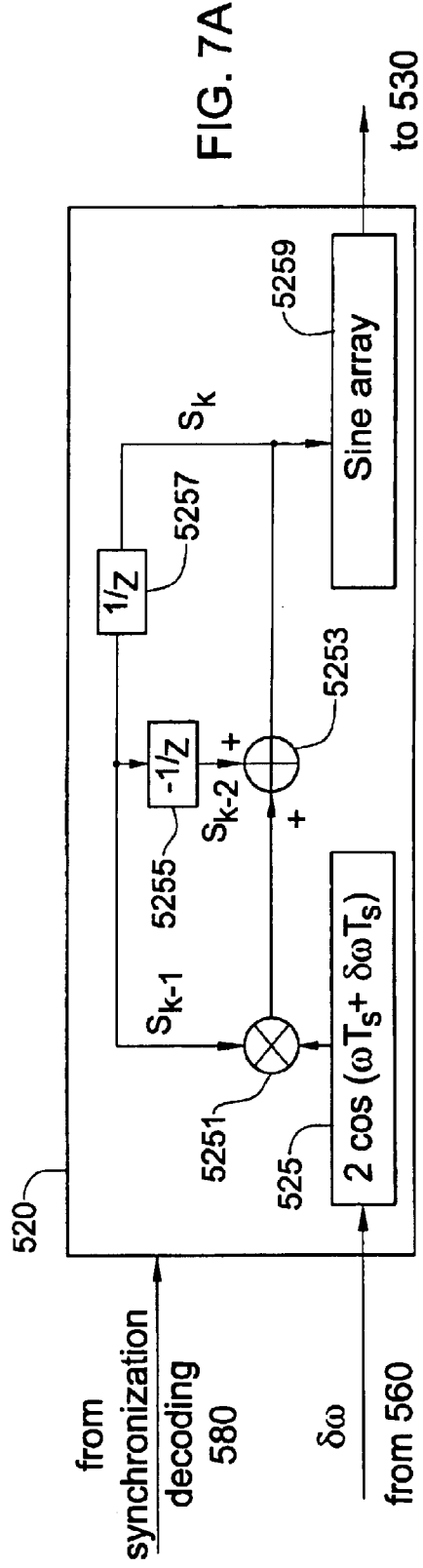
FIG. 7a is a functional block diagram of a sine-wave multiplier of FIG. 4.
Figure 7B:
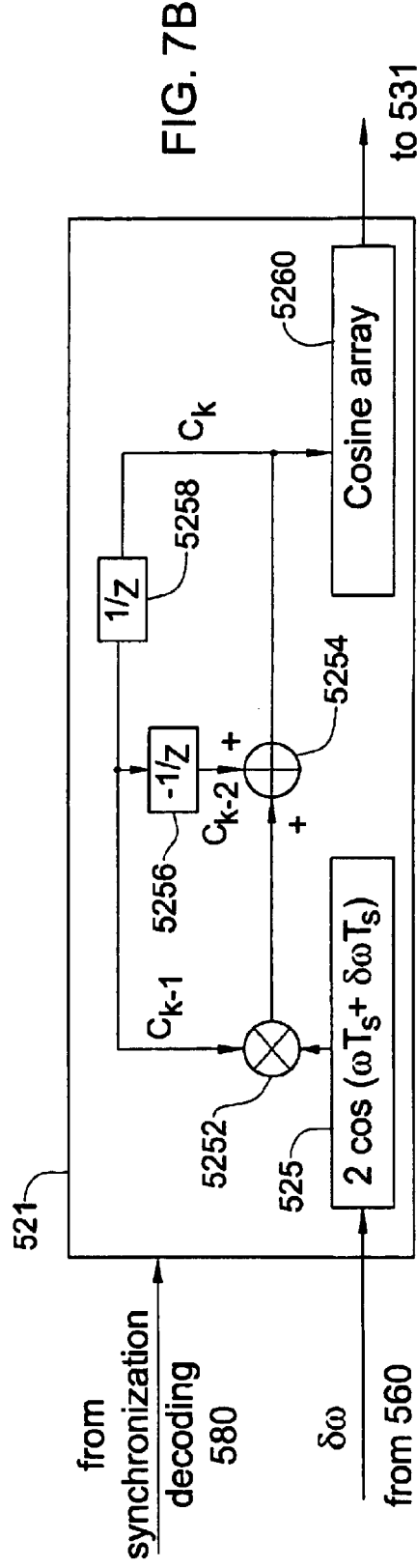
FIG. 7b is a functional block diagram of a cosine-wave multiplier of FIG. 4.

In order to understand the manner of how the sine-wave multiplier 520 and the cosine-wave multiplier 521 generate the sine and cosine waveforms, reference is made to FIG. 7a and FIG. 7b, respectively.

According to the invention, an array of sine and cosine sampled waveforms are built by using a recursive process. Preferably, the number of samples in the waveforms is equal to the number of samples in the frame 510. Each sample hereinafter will be denoted by the subscript 'k'. During the recursive process the generator keeps the values of the previous step, denoted by the subscript 'k–1' and the values of one step before the previous step, denoted by the subscript 'k–2'. Preferably, sine and cosine waves are simultaneously generated in accordance with the following equations:

$$S_k = 2S_{k-1} \cos(\omega T_s + \delta\omega T_s) - S_{k-2} \tag{1}$$

and $$C_k = 2C_{k-1} \cos(\omega T_s + \delta\omega T_s) - C_{k-2}, \tag{2}$$

wherein $S_k$ and $C_k$ are the output of the sine-waveform and cosine-waveform generation, respectively; $T_s$ is the ADC sampling interval, i.e. the time interval between two subsequent samples of the ADC unit 330; and ω is the angular velocity of the carrier as initially provided to the PLL unit 430. One has to bear in mind that the angular velocity varies from carrier to carrier, and, preferably, is stored separately for each PLL process implemented on the DSP 340.

As it should be clear to those skilled in the art, generations of sine and cosine waveforms are virtually identical, since Eqs. (1) and (2) are equivalent. The difference between the generation of a sine waveform and the generation of a cosine waveform is in the initial conditions. Hence, in order to generate a sine waveform one, preferably, begins by setting $S_{k-2}$ to $-\sin(\omega T_s + \delta\omega T_s)$ and $S_{k-1}$ to 0. On the other hand, in order to generate a cosine waveform one, preferably, begins by setting $C_{k-2}$ to $\cos(\omega T_s + \delta\omega T_s)$ and $C_{k-1}$ to 1. For instance, when k=0, such selection of the initial conditions provides the values of $S_0=\sin(\omega T_s+\delta\omega T_s)$ for sine and $C_0=\cos(\omega T_s+\delta\omega T_s)$ for cosine waveforms, respectively.

Accordingly, the generation of the sine and cosine waveforms begins by computing the cosine of the phase increment $\omega$ times $T_s$ plus $\delta\omega$ times $T_s$ multiplied by 2. This operation is executed by cosine computation-units 525 shared between the modules 520 and 521. $\delta\omega$ denotes the error signal as computed and delivered by PD unit 560. Thus, according to the invention, this computation of a trigonometric function takes place once for each frame.

In the generation process, recursively, as soon as $S_k$ is computed, it is stored at its respective location in a sine array 5259. In addition, $S_k$ is delayed by time interval $T_s$ by a first delay unit 5257, thus producing $S_{k-1}$, and then multiplied by the output of the cosine computation unit 525 by using a multiplier 5251. Further, the output of the first delay unit 5257 is delayed once again by the same time interval $T_s$ by a second delay unit 5255 and thus producing $S_{k-2}$. Then, the sign of the $S_{k-2}$ value is inverted and the result is added to the output of the multiplier 5251 by an adder 5253. The result of this addition is $S_k$.

Similarly, recursively, as soon as $C_k$ is computed, it is stored in a cosine array 5260. In addition, $C_k$ is delayed by a first delay unit 5258, thus producing $C_{k-1}$, and then multiplied by the output of the cosine computation unit 525 by using a multiplier 5252. Further, the output of the first delay unit 5258 is delayed again by the same time interval $T_s$ by a second delay unit 5256, thus producing $C_{k-2}$. Then, the sign of the $C_{k-2}$ value is inverted and the result is added to the output of the multiplier 5252 by an adder 5254. The result of this addition is $C_k$.

The results $S_k$ are buffered, recursively, at the array 5259, and the results of $C_k$ are buffered, recursively, at the array 5260. The array 5259 is the output of the sine-wave multiplier unit 520, and the array 5260 is the output of the cosine-wave multiplier 521.

Preferably, the PLL unit 430 stores for each frame the last values of $S_k$ and $C_k$ and the values before the last ones $C_{k-1}$ and $S_{k-1}$ as an input for the next frame generator. As a new frame begins, and k denotes the first sample of the new frame, then the stored values $S_{k-1}$, $S_{k-2}$, $C_{k-1}$, and $C_{k-2}$ are used as initial for the iterative process of the next frame.

One has to bear in mind that digital representation of $\omega$ and $T_s$ as well as sine and cosine computations may introduce some error into the generated waveforms resulting in frequency and amplitude drifts. Thus, it would be advantageous to use a control mechanism to ensure that the error does not propagate beyond a desired limit. Accordingly, since the disclosed implementation embeds the recursive technique inside the PLL unit 340, its phase, therefore, is automatically controlled by the PD unit 560. Regarding the amplitude control, one may easily normalize the amplitude by the end of each frame. For example, this may be done by computing the sum of the squares of $S_{k-1}$ and $C_{k-1}$, and dividing $S_{k-1}$, $S_{k-2}$, $C_{k-1}$ and $C_{k-2}$ by the square root of the sum.

According to the further aspect of the invention, a special technique is designed for providing the PLL with an initial estimate of the envelopes sign. Thus each of the PLL units is provided, preferably, with the phase of the carrier in order to determine the sign of the envelopes. The synchronization signal 350 preferably delivers phase information to the PLL units 430. A synchronization signal is preferably processed by a synchronization-decoding unit 580 that translates it into explicit data available to the PLL units 430. The role of the synchronization decoding unit would be to compare the phase of the sine wave multiplier to that of the corresponding carrier. If the comparison shows that the phase difference nears 180 degrees, then the sign of the sine and cosine wave multipliers would be inverted. The inversion may be readily achieved by inverting the sign of $S_{k-1}$, $S_{k-2}$, $C_{k-1}$ and $C_{k-2}$ before the sine and cosine generation of a new frame begins.

As it should be understood by a man of the art, the invention is not confined to the precise details of the foregoing examples and variations may be made thereto. It is apparent that the demodulation and envelope extraction of the FDMA electromagnetic signal described herein might be considered only as a non-binding example. Accordingly, the described technique can be applied to demodulation and envelope extraction of any other FDMA signal.

The low-pass FIR filters used in the description of the preferred embodiment were used as a non-limiting example of implementation of the present invention. The present invention should not be considered as being limited to the use of these particular filters. A similar solution can be implemented on any combination of FIR filters whose cutoff frequency is smaller than the difference between two adjacent carrier frequencies and smaller than half the rate of the down-decimated output.

Also, it should be clear to a versed man that equation (1) and (2) and the way for generation of sine and cosine waves are shown here as one non-limiting example. In view of this, the present invention is, of course, not bound by this specific embodiment.

Moreover, any reference to a specific implementation in terms of usage of DSP resources, specific implementation of error signal generation, envelope computation, or any other components are shown by way of an example. Other variations are possible within the scope of the present invention as defined in the appended claims and their equivalents.

What is claimed is:

1. A system for coherent detection and demodulation of a FDMA signal being a superposition of amplitude modulated carriers, the system comprising a digital coherent detector for receiving said FDMA electromagnetic signal, processing the signal and extracting a signed envelope of at least one amplitude modulated carrier, the detector comprising:
   (i) a transducer for transforming said FDMA signal into analog electric signal;
   (ii) a front-end electronics for receiving said analog electric signal and providing pre-amplification and pre-filtering of the input signal;
   (iii) an analog to digital converter (ADC) for translating the electric signal coming after said front-end electronics into digitized signal data sampled at fixed ADC sampling intervals; and
   (iv) a digital signal processor (DSP) for processing the digitized signal data and providing a real-time estimate of the signed envelope of at least one amplitude modulated carrier, the system synchronized by a synchronization signal delivering initial phase information to the DSP for estimation of the envelope sign.

2. The system of claim 1 wherein the detector further comprising an automatic gain control unit (AGC) integrated into the front-end electronics, the AGC is operative for keeping dynamic range of the data large enough to make optimal use of the digital depth provided by the ADC and keeping dynamic range of the data small enough to avoid an overflow of the ADC.

3. The system of claim 1 further comprising a synchronization-decoding unit having an input terminal coupled to said synchronization signal and an output terminal coupled to said digital coherent detector, said synchronization-decoding unit for comparing phase information delivered by the synchronization signal to the phase of the carrier as estimated by the said digital coherent detector, said estimate of the phase of the carrier is added half a cycle if the comparison yields a difference close to half a cycle between the said estimate of the phase of the carrier and said phase information delivered by the synchronization signal.

4. The system of claim 1 wherein the DSP comprising:
(a) a framing unit for receiving the sampled digital data from the ADC and storing it in a DSP memory in a form of ready-to-process frames, each of the frames provides one point of the envelope;
(b) a shaping unit coupled to said framing unit for translating the data into a form readable by the DSP; and
(c) an at least one phase-locked loop unit (PLL) for receiving said frames of the data from the shaping unit, rejecting envelopes and carriers others than the one of interest and estimating the single envelope of the single carrier related to a specific source.

5. The system of claim 4 wherein the PLL comprising:
(a) a sine-wave multiplier and a cosine-wave multiplier for generating sine and cosine waves and down-converting the signal data provided by the shaping unit from the carrier frequency into the baseband by multiplication of said sine and cosine waves on said signal data;
(b) a digital, finite impulse-response (FIR), flat pass-band, and sharp cutoff low-pass filter (LPF) for receiving an input data signal and producing a filtered input data signal;
(c) a multiplier for multiplying only once per each frame said frame delivered from the shaping unit by a vector comprising the taps fo the LPF, whereby down-decimation of the data signal is obtained;
(d) a first multiply and accumulate unit (MAC-1) for summing the results of multiplication provided by the sine-wave multiplier referred to in element (a) and the multiplier defined in element (c);
(e) a second multiply and accumulate unit (MAC-2) for summing the results of multiplication provided by said cosine-wave multiplier and said multiplier;
(f) a phase detector for detecting the possible discrepancies between the frequencies and phases of the carrier and the sine-wave multiplier; and for producing an error signal term $\delta\omega$ for correcting the frequency and phase discrepancy; and
(g) an envelope computation unit for receiving the output of the MAC-1 and MAC-2 and computing the envelope.

6. The system of claim 5 wherein the phase detector comprising:
(a) a divider for dividing the output of the MAC-2 by the output of the MAC-1;
(b) a unit for computing an inverse tangent of the result provided by said divider;
(c) a loop filter wherein the output of said unit is split into two channels, the first channel comprising:
  (i) a first gain unit for multiplication in the first channel the output of said unit by a constant $K_1$;
  (ii) an integrator for integrating an output of the first gain unit over time, the second channel comprising a second gain unit for multiplication in the first channel the output of said unit by a constant $K_2$;
(d) an adder for summing outputs of said first and second channels.

7. The system of claim 6 wherein the constants $K_1$ and $K_2$ have values sufficient for preserving the phase of said sine-wave multiplier and cosine-wave multiplier, whereby sign preserving of the envelope is achieved.

8. The system of claim 5 wherein the envelope computation unit comprising:

(a) a first squaring operator for squaring the output of the MAC-1;
(b) a second squaring operator for squaring the output of the MAC-2;
(c) an adder of the envelope computation unit for summing outputs of the first squaring operator and the second squaring operator; and
(d) a square root operator for computing the square root of the summation provided by said adder.

9. The system of claim 5 wherein the sine-wave multiplier comprising:
(a) a sine computation unit for computing the term $2\cos(\omega T_s + \delta\omega T_s)$, wherein $\omega$ is the phase increment, $T_s$ is the sampling interval of the ADC, and $\delta\omega$ is the error signal term for correcting the frequency and phase discrepancy;
(b) a sine array for storing an output of the sine-waveform $S_k$ of the k-th sample;
(c) a first delay unit for receiving the output of the sine array and producing a time delayed data signal $S_{k-1}$;
(d) a multiplier for multiplication of the delayed data signal $S_{k-1}$ by the output of the sine computation unit;
(e) a second delay unit for receiving the output of the first delay unit and producing a double time delayed data signal $S_{k-2}$; and
(f) an adder for summing a negative value of the double time delayed data signal $S_{k-2}$ and the output of said multiplier of item (d).

10. The system of claim 1 wherein the FDMA signal is electromagnetic signal.

11. A method for coherent detection and demodulation of a FDMA signal being a superposition of amplitude modulated carriers of said transmitters, the method comprising the steps of:
(a) transforming the received FDMA signal into an analog electric signal by the transducer;
(b) providing pre-amplification and pre-filtering of the analog electric signal by a front-end electronics;
(c) translating the analog electric signal obtained after step b into digitized signal data sampled at fixed sampling intervals by an analog to digital converter (ADC);
(d) processing the digitized signal data obtained after step c by a digital signal processor (DSP);
(e) delivering phase information obtained after step (d) to the DSP and estimating an envelope by a synchronization signal, and
(f) providing a signed envelope of at least one amplitude modulated carrier.

12. The method of claim 11 wherein the step of processing the digitized signal data by the digital signal processor comprising the following steps:
(a) receiving the sampled digital data from the ADC and storing it in a DSP memory in a form of ready-to-process frames by a framing unit;
(b) translating the data into a form readable by the DSP by a shaping unit; and
(c) receiving frames of the data from the shaping unit, rejecting envelopes and carriers others than the one of interest and estimating the single envelope of the single carrier related to a specific transmitter by a phase-locked loop unit (PLL).

13. The method of claim 12 wherein the step of receiving frames, rejecting envelopes and carriers others than the one of interest and estimating the single envelope of the single carrier by the phase-locked loop unit (PLL) comprising the following steps:

(a) multiplying once per frame the frame delivered from the shaping unit by a vector of the taps of a low-pass filter by using a down-decimation technique, whereby multiplication of the frame by filter taps is performed only once per frame;

(b) generating sine and cosine waveforms;

(c) multiplying point-by-point the resulting frame of step (a) by a sine-wave, whereby down-conversion of the carrier is obtained, and summing the results by a first multiply and accumulate unit (MAC-1);

(d) multiplying point-by-point the resulting frame of step (a) by a cosine-wave, whereby down-conversion of the carrier is obtained, and summing the results by a second multiply and accumulate unit (MAC-2);

(e) feeding the results provided by the MAC-1 and MAC-2 into an envelop computation unit and into a phase detector;

(f) detecting the possible discrepancies between frequencies and phases of the carrier and the sine-wave and producing the error signal $\delta\omega$;

(g) feeding the error signal into sine and cosine multipliers; and (h) computing the envelope and producing a demodulated signal from an output terminal of the envelope computing unit for as many frames as required until said envelope have been determined.

14. The method of claim 13 wherein the step of computing the envelope by the envelope computing unit comprising the following steps:

(a) squaring the output of the MAC-1 by the first squaring operator;

(b) squaring the output of the MAC-2 the second squaring operator;

(c) summing outputs of the first squaring operator and the second squaring operator; and (d) computing the square root of the result of step (c), whereby said envelope of the carrier of interest will be calculated.

15. The method of claim 13 further comprising a step of assigning a sign to the envelope, wherein the assigned sign is the sign of the MAC-1.

16. The method of claim 13 wherein the step of detecting the possible discrepancies between frequencies and phases of the carrier and the sine-wave and producing the error signal $\delta\omega$ comprising the steps of:

(a) dividing the output of the MAC-2 by the output of the MAC-1;

(b) computing the inverse tangent of the result of step (a);

(c) splitting the output of step (b) into two channels, in the first channel (d) multiplying the output of step (b) by a constant $K_1$ and integrating the result over time; in the second channel (e) multiplying the output of step (b) by a constant $K_2$; and (f) summing the outputs of said first and second channels.

17. The method of claim 13 wherein generating sine and cosine waveforms for each frame comprising the steps of:

(a) setting $S_{k-2}$ to $-\sin(\omega T_s + \delta\omega T_s)$, and $S_{k-1}$ to 0 wherein $S_{k-1}$ and $S_{k-2}$ are the sine-waveforms of the k−1th and k−2th samples, respectively;

(b) setting $C_{k-2}$ to $\cos(\omega T_s + \delta\omega T_s)$, and $C_{k-1}$ to 1 wherein $C_{k-1}$ and $C_{k-2}$ are the cosine-waveforms of the k−1th and k−2th samples, respectively;

(c) computing the term $2\cos(\omega T_s + \delta\omega T_s)$, wherein $\omega$ is the phase increment, $T_s$ is the sampling interval of the ADC, and $\delta\omega$ is the error signal term for correcting the frequency discrepancy;

(d) computing $S_k$ according to the following equation:

$$S_k = 2S_{k-1} \cos(\omega T_s + \delta\omega T_s) - S_{k-2};$$

(e) computing $C_k$ according to the following equation:

$$C_k = 2C_{k-1} \cos(\omega T_s + \delta\omega T_s) - C_{k-2};$$

(f) storing in a sine array and providing the sine and cosine waveforms;

(g) producing a first time delay signal $S_{k-1}$ by time interval $T_s$;

(h) producing a second time delay signal $S_{k-1}$ by time interval $T_s$;

(i) returning to step (c) and repeating a sequence of the steps (c) through (h) for as many frames as required until said envelope have been determined.

18. The method of claim 11 wherein the FDMA signal is electromagnetic signal.

19. A method for coherent detection and demodulation of a FDMA signal being a superposition of amplitude modulated carriers, the method comprising the steps of:

receiving said FDMA electromagnetic signal by a system for detection and demodulation of the signal; and processing the received signal by using a PLL technique and extracting an envelope of at least one carrier;

wherein processing the signal by using a PLL technique and extracting an envelope of at least one carrier comprising the steps of:

(a) digitizing, framing and shaping the signal;

(b) down-converting the signal obtained in step (a) to a baseband by multiplying the signal on sine and cosine waves synthesized inside PLL;

(c) rejecting envelopes and carriers others than the one of interest by multiplying the signal obtained in step (b) by filter taps; and (d) computing the envelope of at least one carrier of interest from the result obtained in step (c).

20. The method of claim 19 wherein rejecting envelopes and carriers others than the one of interest is performed by using down-decimating technique, whereby multiplication of the signal by the filter taps is performed only once per frame.

* * * * *